(No Model.)
R. M. KEATING.
ATTACHING DOOR KNOBS TO SPINDLES.
No. 321,818. Patented July 7, 1885.
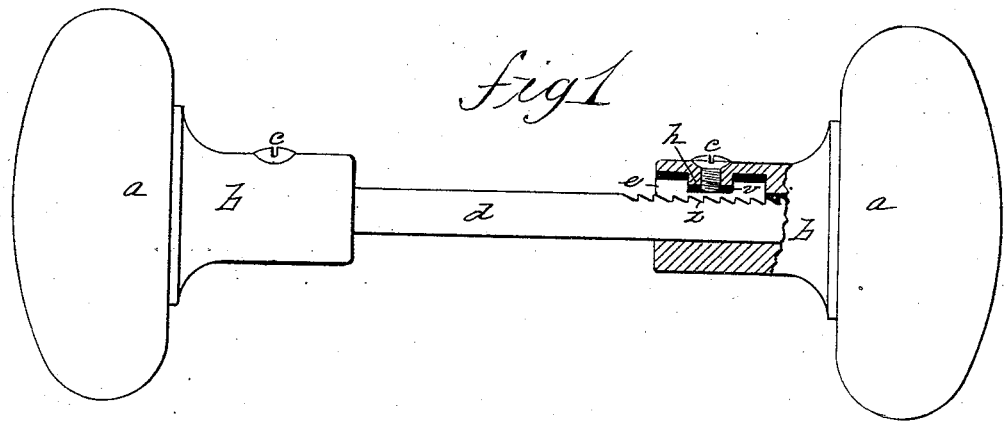
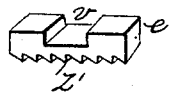
WITNESSES:
INVENTOR
Robert M Keating
BY
Harry A Chapin
ATTORNEY

United States Patent Office.

ROBERT M. KEATING, OF SPRINGFIELD, MASSACHUSETTS.

ATTACHING DOOR-KNOBS TO SPINDLES.

SPECIFICATION forming part of Letters Patent No. 321,818, dated July 7, 1885.

Application filed December 15, 1884. (No model.)

*To all whom it may concern:*

Be it known that I, ROBERT M. KEATING, a citizen of the United States, residing at Springfield, in the county of Hampden and State of Massachusetts, have invented new and useful Improvements in Attaching Door-Knobs to Spindles, of which the following is a specification.

This invention relates to improvements in means for attaching door-knobs to spindles, the object being to provide improved devices for attaching the shank of the knob to the spindle, whereby the two will be susceptible of closer adjustment relative to the thickness of the door than heretofore without using washers, and whereby an improved attachment is provided which prevents any pulling force from being exerted on the screw, whereby the latter becomes loosened.

In the drawings, forming part of this specification, Figure 1 is a side elevation, partly in section, of two door-knobs and a spindle, in which the former are shown secured to the latter, the fastening devices thereof being constructed according to my invention. Fig. 2 is a view of the locking-shoe separate from the knob-shank.

In the drawings, $d$ is the knob-spindle of the usual square form in cross-section, but having, instead of a series of sockets therein to receive the end of the screw $c$ on one side thereof, a series of serrations, $z$, on one side of the part of the spindle which enters the knob-shank $b$. Each of said serrations is made with one inclined face, and one face at right angles to the length of the spindle and facing from the end of the latter. The knob $a$ has the usual shank $b$; but instead of having the usual square-shaped plain-faced socket in it to receive the end of spindle $d$, one of the faces of the latter has a transverse bar, $h$, projecting from it toward the spindle, having sides at right angles to the latter, or in a plane corresponding with said right-angle faces of the serrations $z$ on the spindle. The shank $b$ is provided with the screw $c$, passing through said bar $h$. A locking-shoe, $e$, an enlarged view of which is shown in Fig. 2, has one face serrated to fit the aforesaid serrations on the spindle $d$, and its opposite side has a groove, $v$, across it in which the bar $h$ fits, as shown in Fig. 1. The thickness of shoe $e$ is such that when screw $c$ is turned out from its hole in shank $b$ the shoe may be lifted up away from the serrations in the spindle, so that those, $z'$, of the shoe will not engage with the latter, thereby leaving the spindle and knob free to be adjusted, one to the other, and after said adjustment the screw $c$ is turned against shoe $e$, forcing its serrated face into engagement with the serrations on the spindle, and thus securely locking the knob to the spindle.

By reason of the above-described form of the serrations on the spindle and shoe, and the engagement of the sides of the slot $v$ of the latter with the bar $h$ in the shank, any pulling force on the spindle is exerted against the side of the bar, and not to any extent on the screw $c$, the latter serving only to hold the shoe against the spindle, and hence the screw is not likely to work loose and drop out.

It is obvious that the serrations on the spindle and on the shoe may be made much finer than those herein shown, so that the movement of the shank $b$ on the spindle, to vary the position of the former the width of one tooth, would be very little.

The shoe $e$ may be made of any suitable metal or other material; but steel hardened is preferable, and the serrations on both shoe and spindle have inclined faces only; but the form shown relieves the screw $c$, as set forth.

What I claim as my invention is—

1. The spindle $d$, having serrations on one side thereof, the knob-shank $b$, having the bar $h$ projecting from one side of its spindle-socket, the shoe $e$, having serrations to engage with those on the spindle, and a groove to engage with said bar $h$ and the screw $c$, combined and operating substantially as set forth.

2. The spindle $d$, having serrations on one side thereof whose faces are formed at an incline and at right angles to the serrated side of the spindle, the knob-shank $b$, having the bar $h$ projecting from one side of its spindle-socket, the shoe $e$, having serrations thereon of like form to those on the spindle, and a groove to engage with said bar $h$ and the screw $c$, combined and operating substantially as set forth.

ROBERT M. KEATING.

Witnesses:
H. A. CHAPIN,
J. D. GARFIELD.